United States Patent
Ou et al.

(10) Patent No.: US 7,531,979 B2
(45) Date of Patent: May 12, 2009

(54) DIRECT DRIVE ROBOTIC MANIPULATOR

(75) Inventors: Gang Ou, Singapore (SG); Ajit Gaunekar, Sinagpore (SG); Tin Kwan Bobby Chan, Singapore (SG); Gary Peter Widdowson, Hong Kong (HK); Yun Bo He, Singapore (SG); Dong Sheng Zhang, Singapore (SG)

(73) Assignee: ASM Technology Singapore Pte Ltd., Singapore (SG)

( * ) Notice: Subject to any disclaimer, the term of this patent is extended or adjusted under 35 U.S.C. 154(b) by 298 days.

(21) Appl. No.: 11/532,787

(22) Filed: Sep. 18, 2006

(65) Prior Publication Data

US 2008/0067966 A1    Mar. 20, 2008

(51) Int. Cl.
*B25J 5/00* (2006.01)
(52) U.S. Cl. .............................. 318/568.1; 318/568.11; 901/25.28; 414/744.5; 74/490.01
(58) Field of Classification Search .............. 318/568.1, 318/568.11, 568.12; 901/20–28; 74/490.04; 414/744.5
See application file for complete search history.

(56) References Cited

U.S. PATENT DOCUMENTS

| | | | | | |
|---|---|---|---|---|---|
| 4,907,467 | A | * | 3/1990 | Toyoda et al. ............ | 74/490.03 |
| 4,984,959 | A | * | 1/1991 | Kato ........................ | 414/744.3 |
| 5,291,112 | A | * | 3/1994 | Karidis et al. ............ | 318/568.1 |
| 5,293,107 | A | * | 3/1994 | Akeel ..................... | 318/568.11 |
| 5,918,510 | A | * | 7/1999 | Uemura et al. ............ | 74/813 L |
| 6,247,889 | B1 | * | 6/2001 | Kono et al. ............... | 414/744.5 |
| 6,764,271 | B2 | * | 7/2004 | Momoki ................... | 414/744.5 |
| 7,192,241 | B2 | * | 3/2007 | Momoki ................... | 414/744.5 |
| 7,383,751 | B2 | * | 6/2008 | Hashimoto et al. ....... | 74/490.01 |
| 2002/0094265 | A1 | * | 7/2002 | Momoki ................... | 414/744.5 |
| 2003/0159535 | A1 | * | 8/2003 | Grover et al. ............ | 74/490.04 |
| 2004/0174162 | A1 | * | 9/2004 | Kuwahara .............. | 324/207.25 |
| 2008/0067966 | A1 | * | 3/2008 | Ou et al. ................ | 318/568.12 |

* cited by examiner

*Primary Examiner*—Paul Ip
(74) *Attorney, Agent, or Firm*—Ostrolenk, Faber, Gerb & Soffen, LLP

(57) ABSTRACT

A direct drive robotic manipulator is provided which includes a plurality of segments that are rotatably coupled with respect to one another. A plurality of spindles connects the segments for relative rotation therebetween, and a plurality of direct drive assemblies is further coupled to the plurality of spindles. Each direct drive assembly encloses an end of a spindle and comprises a rotor assembly to which the spindle is attached for manipulating the spindle. A positional measurement apparatus may also be included at each direct drive assembly to ascertain an angular disposition of a segment relative to an adjoining segment.

13 Claims, 4 Drawing Sheets

DIRECT DRIVE ROBOTIC MANIPULATOR

FIELD OF INVENTION

The present invention relates generally to an articulated robotic manipulator, and more particularly to a direct drive manipulator configuration.

BACKGROUND OF THE INVENTION

Conventional Selective Compliant Articulated/Assembly Robot Arms (SCARA) in the market are driven through transmission systems, such as gear trains, belts-and-pulleys, chains and linkages, which are used to transmit power from the drive motors to the load. The motors are typically located at the base of the robot structure, and the upper arms are moved by the transmission systems linking the drive motor to the arms.

Although transmission systems provide increased drive torques, they have inherent imperfections, such as friction and wear in the transmission elements, which result in degradation of performance over time. Transmission systems are also subject to backlash and hysteresis, which introduces inaccuracy in positioning the end-effector. Further, the compliance chain in transmission from the motor to the end-effector results in reduced controllability of each axis of the robot and thus degrades performance in terms of lower operation bandwidth. To overcome these limitations, additional complicated and bulky mechanisms have to be employed. In addition, careful adjustment and regular maintenance of the transmission systems are necessary. These measures inevitably increase costs of constructing and maintaining a conventional robot.

Another limitation of conventional robots is the indirect measurement of the angular position of the robot arms. Typically, angular position of the arm is deduced from the rotation of the motor which indirectly drives the arm through a transmission system. Indirect measurement of the arm position leads to significant errors in ascertaining the position of the end effector. In high precision applications such as semiconductor fabrication, such positioning errors are unacceptable.

In view of the foregoing limitations, it is desirable to provide a robotic manipulator configuration which eliminates the imperfections of transmission systems and also improves accuracy of positional measurement and feedback.

SUMMARY OF THE INVENTION

The present invention provides a direct drive robotic manipulator having a plurality of segments or arms which are actuated by separate direct drive assemblies. The direct drive assembly for each segment is preferably located at a portion of the segment, such as a joint portion thereof between two adjoining or intersecting segments.

Accordingly, in one embodiment of the invention, a direct drive robotic manipulator is provided which includes a plurality of segments that are rotatably coupled with respect to one another. A plurality of spindles is provided for connecting the segments for relative rotation therebetween. A plurality of direct drive assemblies is further coupled to the plurality of spindles. Each direct drive assembly encloses an end of a spindle and comprises a rotor assembly to which the spindle is attached for manipulating the spindle.

These and other various features as well as advantages which characterize the present invention will be apparent upon reading of the following detailed description and review of the associated drawings.

DETAILED DESCRIPTION OF THE PREFERRED EMBODIMENT OF THE INVENTION

In the following description, numerous specific details are set forth in order to provide a thorough understanding of various embodiments of the present invention. It will be understood, however, to one skilled in the art, that embodiments of the present invention may be practiced without some or all of these specific details. In other instances, well known configurations and operations have not been described in detail in order not to unnecessarily obscure pertinent aspects of embodiments being described.

Figure 1:
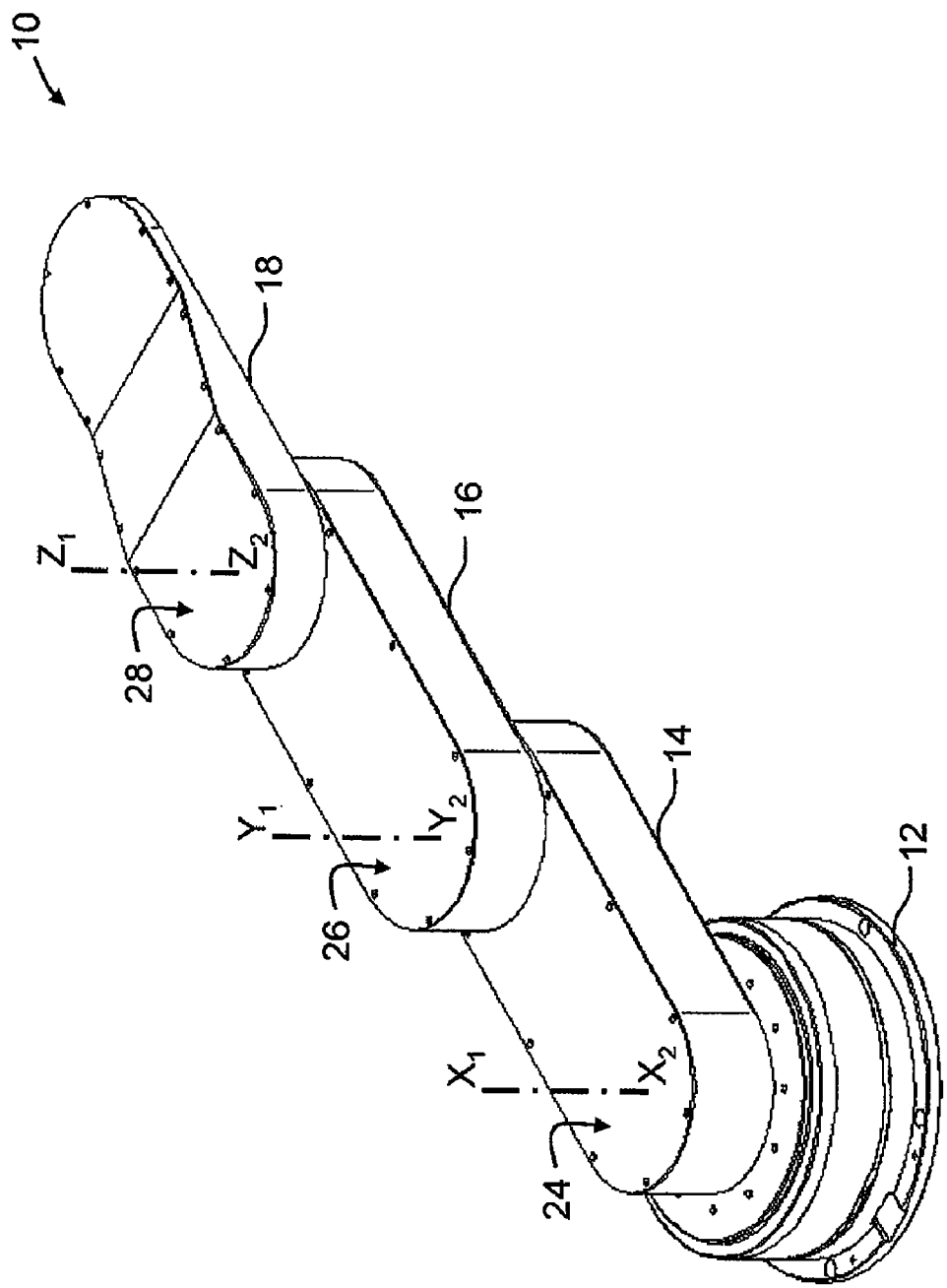
FIG. 1 illustrates a perspective view of a robotic manipulator according to the preferred embodiment of the present invention.
Figure 2:
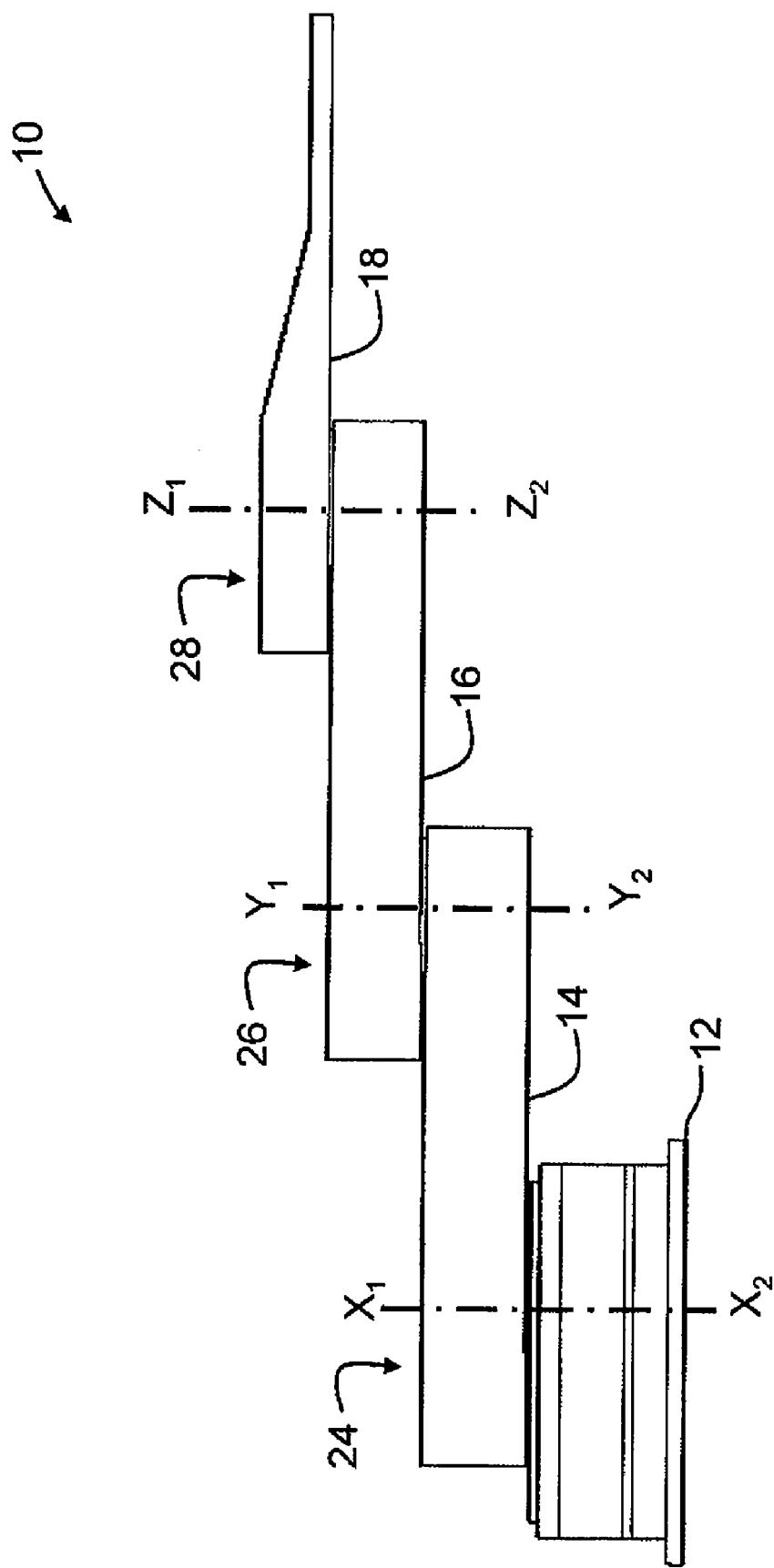
FIG. 2 illustrates a schematic side view of a robotic manipulator of FIG. 1.

References are now made to FIG. 1 and FIG. 2 which illustrate various views of a robotic manipulator 10 according to one embodiment of the present invention. The robotic manipulator 10 comprises a plurality of segments 12, 14, 16, 18 that are rotatably coupled with respect to one another. A base segment, such as base 12, is fixedly mounted onto a stationary support surface. A first segment 14 (shoulder arm) is coupled to the base 12 at a first joint portion 24 (shoulder joint). The first joint portion 24 is generally disposed at 24 as illustrated and allows the first segment 14 to rotate about a vertical axis $X_1$-$X_2$ passing through a center of the first joint portion 24.

At one end of the segment 14 remote from the first joint portion 24, the first segment 14 is coupled to a second segment 16 (elbow arm) at a second joint portion 26 (elbow joint). The second joint portion 26 is generally disposed at 26 as illustrated and allows the second segment 16 to rotate about a vertical axis $Y_1$-$Y_2$ passing through a center of the second joint portion 26. At one end of the second segment 16 distal from the second joint portion 26, the second segment 16 is coupled to a third segment 18 (end-effector) at a third joint portion 28 (wrist joint). The third joint portion 28 is generally disposed at 28 as illustrated and allows the third segment 18 to rotate about a vertical axis $Z_1$-$Z_2$ passing through a center of the third joint portion 28. The third segment 18 is most remote from the base 12 and is preferably mounted with a processing tool. Examples of processing tools that may be mounted to the third segment 18 include a wafer holder or a pick-and-place tool, which may follow a different axis of motion from the above-described segments. It should be appreciated that the axes of motion of the three segments 14, 16, 18 are preferably substantially parallel.

Figure 3:
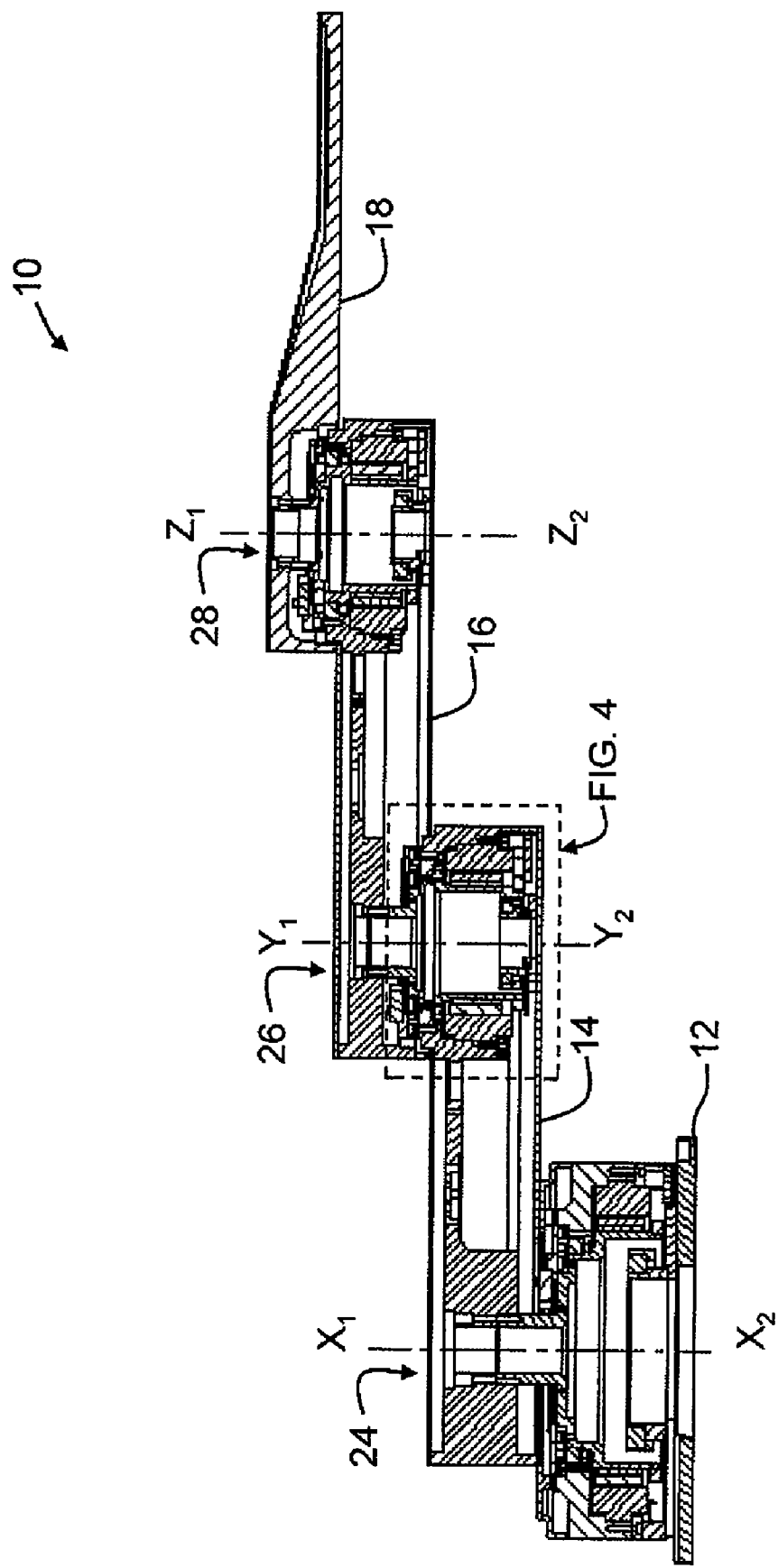
FIG. 3 illustrates a sectional side view of a robotic manipulator of FIG. 2.

Reference is now made to FIG. 3 which illustrates a sectional side view of the robotic manipulator 10 of FIG. 2. According to one embodiment of the present invention, various segments are linked to one another in an ascending step configuration as illustrated in FIGS. 1 to 3. However, the segments may be linked in other configurations which may have substantially different axes of rotation.

Figure 4:
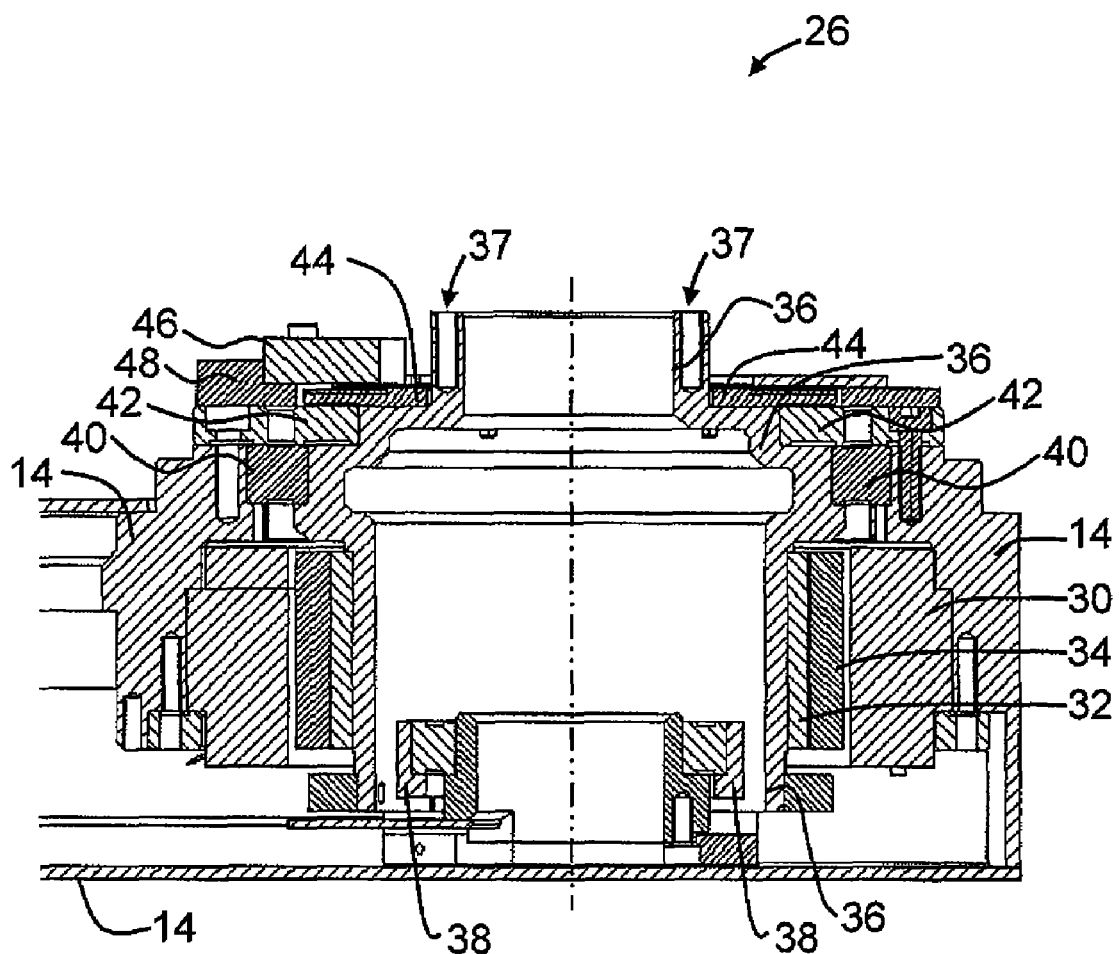
FIG. 4 illustrates a partial cross-sectional view of a joint portion in a robotic manipulator of FIG. 3.

Reference is now made to FIG. 4 which illustrates a partial cross-sectional view of a robotic joint according to the preferred embodiment of the invention. The partial sectional view of FIG. 4 is generally taken from the cut-away portion as shown in FIG. 3. The following description is detailed with reference to the second joint portion 26 (elbow joint) for illustrative purposes only and is to be understood that the description and configuration relating to the second (elbow) joint portion 26 (with suitable modification if necessary) are equally applicable to other joint portions 24, 28.

As shown in FIG. 4, the present invention provides a joint portion 26 disposed at an intersection between a first segment 14 and an adjoining second segment 16. The joint portion 26 houses a direct drive assembly as well as a positional measurement apparatus. The motor assembly comprises a stator assembly 30 comprising a coil bracket including coils configured to carry current, that is fixedly mounted to the first segment 14 and a rotor assembly arranged within an inner circumference of the stator assembly 30. The rotor assembly includes a magnetic support ring 32 and permanent magnets 34 affixed on the outer periphery of the magnetic support ring 32. Alternatively, the rotor assembly may comprise a coil bracket including coils configured to carry current, and the stator assembly 30 may comprise permanent magnets.

A spindle 36, in the form of a hollow sleeve, has one end received and enclosed by the direct drive assembly, and is further attached to the rotor assembly for manipulating the spindle 36. The rotor assembly is coaxially received by the stator assembly 30. A plurality of spindles 36 thus connect the various segments 12, 14, 16, 18 for relative rotation therebetween. A plurality of direct drive assemblies are in turn coupled to the plurality of spindles 36.

One end of the spindle 36 extends into the interior of the second segment 16 and is fixedly connected to one end of the second segment 16 (see FIG. 3). To this end, threaded mounting holes 37 may be provided at the aforementioned end of the spindle 36 to receive mounting screws for attaching the second segment 16 to the spindle 36. With this configuration, the spindle 36 directly actuates the second arm 16 as the spindle 36 turns. An opposite end of the spindle 36 is suitably dimensioned to be housed within the joint portion 26 for a compact configuration. Electric or service lines (not shown) may be disposed within the hollow center of the spindle 36 for routing between the adjoining first and second segments 14, 16. End stoppers 38 may be disposed on each spindle, such as at a lower end of the spindle 36, to arrest the turning motion of the spindle 36 and the second segment 16 to define the limits of motion of the second segment 16. Preferably, the plurality of spindles 36 have axes of rotation that are substantially parallel.

Bearings 40 may be interposed between a relatively stationary part, such as the first segment 14, and the spindle 36 to rotatably support the turning spindle 36. The bearings 40, for example cross-roller bearings, may be provided in the form of a single bearing ring which uses crossed rollers to support the rotating segment 16. This provides high stiffness to the relatively stationary components of the joint portion 26 while keeping the entire joint configuration compact. The bearings 40 may be supported and retained in place by a bearing flange 42 disposed to abut the bearings 40, such as, immediately above the bearings 40. The bearing flange 42 may include an inner flange portion to support a moving inner portion of the bearing 40 against the spindle 36, and an outer flange portion to support an outer portion of the bearing 40 against the first segment 14.

In addition to the motor drive assembly, the first joint portion 24 preferably includes a positional measurement apparatus, such as a rotary optical encoder. The encoder may be located proximate to the spindle 36 and adjoining segment 16 to be driven. The rotary optical encoder includes an encoder scale 44 for defining angular positions and an encoder head 46 for ascertaining an angular disposition of the segment 16. The encoder scale 44 has an annular track disposed around a surface concentric with the longitudinal axis $Y_1$-$Y_2$ of the spindle 36. The encoder head 46 may be supported by an encoder mount 48 and disposed at a relatively short distance from the encoder scale 44 to read the encoder scale 44 and optically sense the angular disposition of the rotating spindle 36 that is actuating the second segment 16 and therefore to ascertain the rotary disposition of the second segment 16. Although a rotary optical encoder is herein described, it should be appreciated that other types of positional measurement apparatus, such as a magnetic encoder, may be used with the present invention.

As understood from the foregoing, the preferred embodiment of the present invention provides a robotic manipulator 10 having more than two linked segments 12, 14, 16, 18 operated by separate direct drive assemblies. With direct driving of each segment, transmission systems are eliminated and therefore the inherent imperfections and losses associated with having a transmission system are avoided with the present invention. Also, due to an absence of transmission systems, fewer components are required, thus resulting in higher operating reliability. The present invention further provides a positional measurement apparatus disposed at each joint portion of each segment to directly measure the angular disposition of the segment. This results in improved positioning accuracy due to direct positional measurement. With the compact design and requirement for fewer components, the present invention is easy to assemble and at lower costs.

Other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

The invention claimed is:

1. A direct drive robotic manipulator comprising:
   a stationary support surface;
   a base segment fixedly mounted on the stationary support surface;
   a first segment having a first end and a second end opposite the first end of the first segment;
   a first spindle rotatably coupling the first end of the first segment to the base segment;
   a second segment having a first end and a second end opposite the first end of the second segment;
   a second spindle rotatably coupling the first end of the second segment to the second end of the first segment;
   a third segment having a first end;
   a third spindle rotatably coupling the first end of the third segment to the second end of the second segment; and
   a plurality of direct drive assemblies including a first direct drive assembly positioned in the base segment to drive the first spindle, a second direct drive assembly positioned in the first segment to drive the second spindle and a third direct drive assembly positioned in the second segment to drive the third spindle,
   each direct drive assembly encloses an end of a spindle and comprises comprising a rotor assembly having permanent magnets mounted on a respective spindle to be driven, and a stator assembly having a coil bracket surrounding the rotor assembly and enclosing one end of the respective spindle.

2. The direct drive robotic manipulator according to claim 1, wherein the stator assembly is configured to coaxially receive the rotor assembly.

3. The direct drive robotic manipulator according to claim 1, wherein each direct drive assembly further includes a positional measurement apparatus that is operative to ascertain an angular disposition of one segment relative to an adjoining segment.

4. The direct drive robotic manipulator according to claim 3, wherein the positional measurement apparatus comprises a rotary optical encoder or a magnetic encoder.

5. The direct drive robotic manipulator according to claim 4, wherein the rotary optical encoder comprises an encoder scale having an annular track disposed around a surface concentric with a longitudinal axis of the respective spindles and the rotary optical encoder comprises an encoder head disposed to read the encoder scale.

6. The direct drive robotic manipulator according to claim 1, wherein an end of the respective spindle opposite to said one end enclosed by the stator assembly is fixedly connected to an adjoining segment.

7. The direct drive robotic manipulator according to claim 1, wherein the first, second and third spindles have axes of rotation that are substantially parallel.

8. The direct drive robotic manipulator according to claim 1, wherein the third segment is mounted with a wafer holder or a pick-and-place tool.

9. The direct drive robotic manipulator according to claim 1, wherein each direct drive assembly is housed within a casing for each segment.

10. The direct drive robotic manipulator according to claim 1, wherein the first, second and third segments are linked to one another in an ascending step configuration.

11. The direct drive robotic manipulator according to claim 1, wherein each spindle includes a hollow center that is configured for containing electrical or service lines.

12. The direct drive robotic manipulator according to claim 1, further comprising an end stopper disposed on each spindle for arresting turning motion of the each spindle at its limits of motion.

13. The direct drive robotic manipulator according to claim 1, further comprising cross-roller bearings interfaced between each segment and a spindle connected to it for supporting the connected spindle during rotation.

* * * * *